US006542759B1

(12) United States Patent
Fujiki et al.

(10) Patent No.: US 6,542,759 B1
(45) Date of Patent: Apr. 1, 2003

(54) RADIO COMMUNICATION APPARATUS AND METHOD FOR RADIO COMMUNICATION

(75) Inventors: Shiro Fujiki, Yokohama (JP); Hideo Takei, Yokohama (JP)

(73) Assignee: Yaesu Musen Co., Ltd., Tokyo (JP)

( * ) Notice: Subject to any disclaimer, the term of this patent is extended or adjusted under 35 U.S.C. 154(b) by 267 days.

(21) Appl. No.: 09/644,627

(22) Filed: Aug. 23, 2000

Related U.S. Application Data

(62) Division of application No. 09/075,673, filed on May 11, 1998, now Pat. No. 6,188,891.

(30) Foreign Application Priority Data

Jun. 14, 1997 (JP) ............................................. 9-173258
Jul. 31, 1997 (JP) ............................................. 9-218944
Apr. 15, 1998 (JP) ........................................... 10-119903

(51) Int. Cl.$^7$ ................................................ H04B 1/38
(52) U.S. Cl. ..................................................... 455/575
(58) Field of Search ............................ 455/421, 73, 88, 455/97, 575, 62, 63, 67.1, 67.7, 404

(56) References Cited

U.S. PATENT DOCUMENTS 5,732,347 A * 3/1998 Bartle et al. ................. 455/421
5,867,782 A * 2/1999 Yoon .......................... 455/67.7

* cited by examiner

Primary Examiner—Thanh Cong Le
(74) Attorney, Agent, or Firm—Rader, Fishman & Grauer PLLC

(57) ABSTRACT

A radio communication apparatus has a switch for indicating occurrence of emergency, a speaker, a speaker driver for emitting an alarm sound by driving said speaker in response to the operation of the switch, and a transmitter for transmitting a predetermined alarm signal by radio. When an emergency condition occurs to an owner of the radio communication apparatus, the radio communication apparatus emits an alarm sound from the speaker and emits an alarm signal by radio in response to a switching operation. Therefore, a person a short-distance away will be informed of an emergency by sound, and a person a long-distance away will be received by using a radio.

6 Claims, 9 Drawing Sheets

RADIO COMMUNICATION APPARATUS AND METHOD FOR RADIO COMMUNICATION

This is a division of application Ser. No. 09/075,673, filed May 11, 1998, now U.S. Pat. No. 6,188,891.

BACKGROUND OF THE INVENTION

1. Field of the Invention

This invention relates to a radio communication apparatus, and more specifically to a radio communication apparatus and a method for radio communication for use in case of an emergency.

2. Description of the Related Art

Users of a radio communication apparatus have a duty when an emergency such as disaster occurs, the users have to inform many other radio users of stricken conditions by radio.

In case of amateur radio communication apparatus, it is the general use when an emergency occurs, the user changes the operating frequency to a predetermined CALL frequency before communication. For example, in an FM communication, JARL (Japan Amateur Radio League) designates a CALL frequency for an emergency communication frequency, 433 MHz for a main frequency, 433.50 MHz for a sub frequency, etc. When the CALL frequency is set for an emergency communication frequency, someone who is waiting for a call can receive an emergency communication, and can be informed of occurrence of emergency and these conditions.

However, when an emergency occurs, a conventional radio communication apparatus has to be changed from a communicating frequency to an emergency communication frequency by the operator him/herself. Therefore, prompt correspondence can not be done.

And when a reception side radio communication apparatus receives a radio which indicates occurrence of emergency, if the sound volume of the reception side radio communication apparatus is low, the operator can not be informed of received contents. The same matter occurs, for example, in the case of the system which is composed of a base station and a plurality of branch stations, when a base station calls branch stations.

Moreover, a conventional radio communication apparatus can not be used when an owner is in a disaster and can not operate for radio communication, the owner can not ask for help by using a radio communication apparatus.

SUMMARY OF THE INVENTION

The present invention has been made in consideration of the above-described conditions, and it is an object of the present invention to provide a radio communication apparatus and a method for radio communication which can be used effectively when an emergency occurs.

It is a further object of the present invention to provide a radio communication apparatus and a method for radio communication which can promptly change an operating frequency to an emergency communication frequency by easy operation.

It is a still further object of the present invention to provide a radio communication apparatus and a method for radio communication which can automatically adjust the sound volume on appropriate value in response to a call.

It is another object of the present invention to provide a radio communication apparatus when an owner him/herself is in a disaster, the owner can ask for help by using it.

According to the first aspect of the present invention having the above-described objects, there is provided a radio communication apparatus comprised of a switch, a speaker, a speaker driver for driving the speaker and emitting a warning sound in response to an operation of the switch, and a transmitter for transmitting a predetermined warning signal by radio in response to an operation of the switch.

According to this structure, when an emergency occurs to an owner of this radio communication apparatus, by only depressing a switch (button, key, etc.) can be informed of an emergency of people a short-distance away by an alarm sound from a speaker, and of people a long-distance away by radio. Therefore, the owner of this radio communication apparatus can be easily rescued.

The speaker driver outputs a burst signal in response to the operation of the switch. The speaker is also operated by this burst signal. In this case, the transmitter can also transmits the burst signal by radio in response to the operation of the switch.

The transmitter can also change from the current frequency to a predetermined frequency in response to the operation of the switch.

Irrespective of speaker volume, it can also emit an alarm sound from the speaker on predetermined sound volume.

According to the second aspect of the present invention having the above objects, there is provided a radio communication apparatus comprised of:

a receiver for receiving a radio signal;

a speaker for emitting a sound signal contained in a radio signal received by the receiver;

a volume switch for adjusting sound volume of the speaker;

discrimination means for discriminating whether or not a radio signal received by the receiver contains a predetermined control signal; and means for adjusting sound volume of the speaker to a predetermined level irrespective of the sound volume when the discrimination means discriminates that the radio signal contains the predetermined control signal.

The radio communication apparatus containing that structure sets the volume of a speaker to a predetermined level such as the maximum level when a predetermined control signal is received irrespective of the volume setting of the speaker. Therefore, it can prevent from the case, for example, in which an owner of the radio communication apparatus fails to hear a received sound because sound volume is too low, and it can diminish miss hearing. Thus, it is superior in emergency communication.

The predetermined control signal contains, for example, a discrimination code allotted from a received signal of the receiver to itself and a predetermined emergency control code.

The predetermined control signal is a control code based on one code system of such as CTCSS (Continuous Tone Controlled Squelch System), MSK (Minimum Shift Keying), DCS (Digital Coded Squelch), DTMF (Dual Tone Multi Frequency), 2TONE (Two Tone Signaling) and 5TONE (Sequential Tone Signaling).

The above radio communication apparatus may further be comprised of a switch for indicating emergency, and a function for transmitting a discrimination code allotted to itself and a discrimination code indicating emergency in response to the operation of the switch.

According to the third aspect of the present invention having the above objects, there is provided a radio communication apparatus, wherein:

a switch;

a transmitter for transmitting a predetermined code one time with a first frequency in response to the operation of the switch when the switch is operated while communicating with another radio communication apparatus with the first frequency, and then transmitting the predetermined code with a second frequency which is different from the first frequency; and a receiver for changing the reception frequency to the second frequency when a predetermined code is received while communicating with the another radio communication apparatus using the first frequency.

According to the radio communication apparatus of this structure, a communication frequency can be immediately changed to the second frequency by operating a switch during communication. Normally, in case of emergency communication (urgent communication), it is allotted to an emergency communication frequency which is different from a normal communication frequency. Therefore, the first frequency is set for normal communication and the second frequency is set for emergency communication, and both reception and transmission sides can immediately change to an emergency communication frequency when an emergency occurs in communication.

According to the fourth aspect of the present invention having the above objects, there is provided a radio communication apparatus, wherein:

an emergency switch for indicating occurrence of emergency;

memory for storing a control code indicating occurrence of emergency;

transmission means for reading out the control code from the memory by an operation of the emergency switch, and transmitting the control code with the former transmission frequency;

means for changing the transmission frequency of the transmission to an emergency communication frequency after transmission of the control code; and reception means for receiving a radio signal and changing the call frequency upon detection of the control code in the received signal.

This structure also enables that both reception and transmission sides can immediately change to an emergency communication frequency when an emergency occurs in communication.

The above radio communication apparatus may comprise means for returning to the former frequency after measuring the suspension period of time of communication of an emergency communication frequency and when the suspension period of time exceeds a predetermined period.

The above radio communication apparatus may also comprise the transmission means transmits a signal containing a discrimination code allotted to itself in response to the operation of the emergency switch with on an emergency communication frequency and the reception means discriminates whether or not the suspension period of a received signal with a discrimination code of a remote radio station is exceeded, and when it is determined that the suspension period exceeds a fixed period, return to the former call frequency.

The control code is a control code based on one code system of such as CTCSS, MSK, DCS, DTMF, 2TONE and 5TONE.

According to the fifth aspect of the present invention having the above-described objects, there is provided an emergency alerting method using a radio communication apparatus, the method comprises the steps of emitting an alarm sound from a speaker in response to an operation of a switch indicating occurrence of emergency and transmitting a predetermined alarm signal by radio in response to the operation of the switch.

According to the sixth aspect of the present invention having the above-described objects, there is provided a sound volume control method comprising:

a reception step of receiving and reproducing a radio signal and emitting a sound;

an adjusting step of adjusting a volume of a sound emitted by the reception step;

a discrimination step of discriminating whether or not a received radio signal contains a predetermined control signal; and a setting step of setting the volume of the sound to a predetermined level irrespective of the volume adjusted by the adjusting step when the received signal discriminated by the discrimination step contains the predetermined control signal.

According to the seventh aspect of the present invention having the objects described above, there is a method provided for changing a communication frequency in case of emergency while at least two radio communication apparatuses, including first and second radio communication apparatuses, are communicating with each other using a first communication frequency and when a predetermined switch with which the first radio communication apparatus is equipped is operated, the method comprising steps of:

transmitting a predetermined code one time with the first frequency from the first radio communication apparatus, and then transmitting a predetermined code with a second frequency for emergency communication from the first radio communication apparatus receives a predetermined code transmitted from the first radio communication apparatus; and making the second radio communication apparatus change a reception frequency to the second frequency when the second radio communication apparatus receives the predetermined code transmitted with the first frequency from the first radio communication apparatus.

DETAILED DESCRIPTION OF THE PREFERRED EMBODIMENT

The embodiment of the present invention will be described later.

First Embodiment

Figure 1:
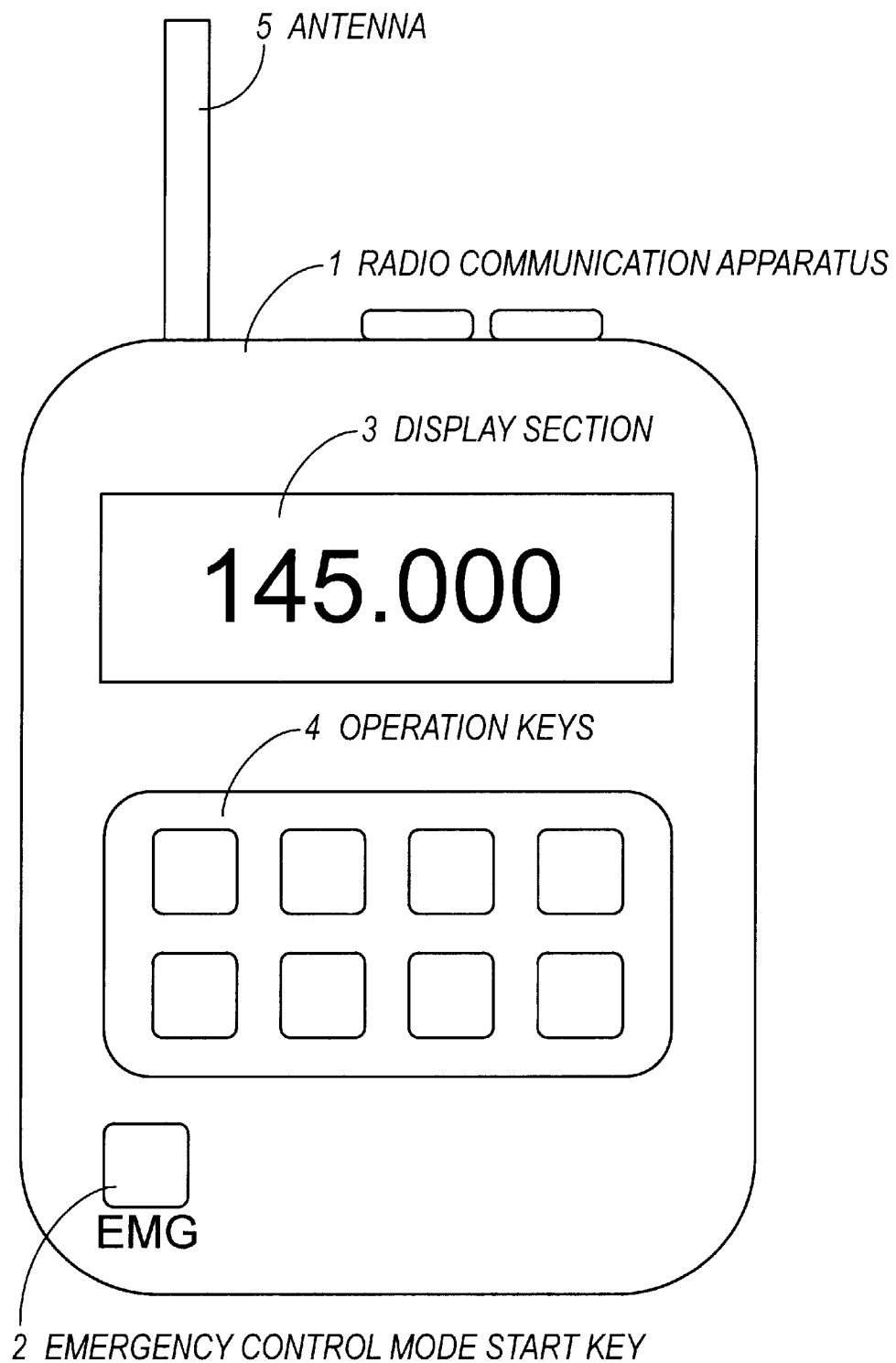
FIG. 1 is a outward view showing the radio communication apparatus according to the first and second embodiment of the present invention.

FIG. 1 is a outward view showing the radio communication apparatus 1 according to the first embodiment of the present invention.

As shown in the figure, this radio communication apparatus 1 comprises an emergency mode start key (EMG key) 2, a display section 3, operation keys 4 and an antenna 5.

The emergency mode start key (EMG key) 2 is a specific key of this embodiment for setting the radio communication apparatus 1 in an emergency mode, and setting a mode for transmitting the fact of occurrence of emergency as a sound and radio signal.

The display section 3 displays information.

The operation keys 4 have a plurality of keys for inputting data, commands, etc.

The antenna 5 transmits and receives a radio signal.

Figure 2:
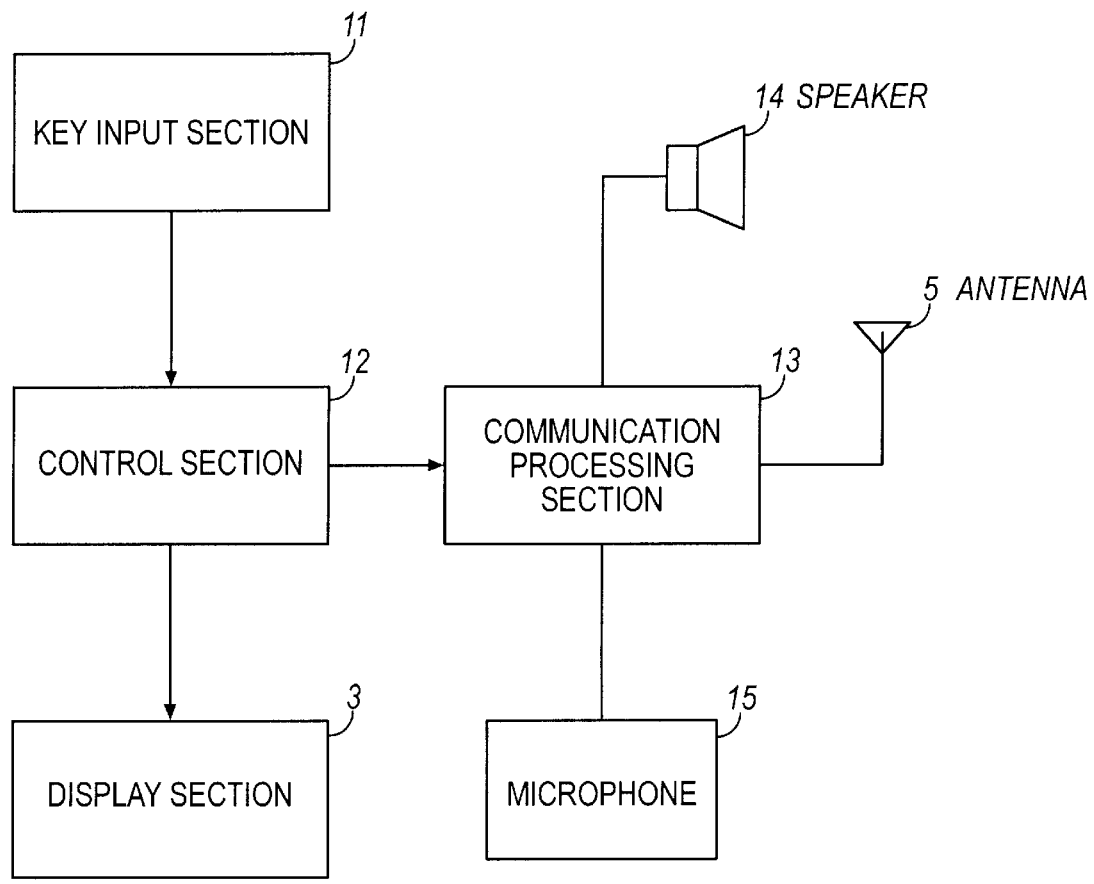
FIG. 2 is a circuit diagram showing the circuit structure of the radio communication apparatus according to the first and second embodiment of the present invention.

FIG. 2 is a block diagram showing a circuit structure of the radio communication apparatus 1.

As shown in the figure, the radio communication apparatus 1 comprises a key input section 11 which contains the emergency mode start key 2 and the operation keys 4, a control section 12, a communication processing section 13, a speaker 14, a microphone 15, the display section 3 and the antenna 5.

The key input section 11, which is containing the emergency mode start key 2 and the operation key 4 as shown in FIG. 1, inputs data and commands.

The control section 12 controls a normal transmission operation and normal reception operation in response to an input from the key input section 11, and controls an emergency process operation.

The communication processing section 13, controlled by the control section 12, demodulates sound input from the microphone 15 and transmits from the antenna 5, and also modulates a signal received by the antenna 5 and emits a sound from the speaker 14. Moreover, when it is emergency, the communication processing section 13 emits a beep sound from the speaker 14 and transmits a beep sound by radio.

The speaker 14 emits the received signal sound in normal mode and emits the beep sound in emergency mode.

The microphone 15 inputs the sound to the communication processing section 13.

In normal mode, the radio communication apparatus 1 performs as same as a known communication apparatus. Specifically, the control section 12, based on an indication supplied from the key input section 11, sets the communication processing section 13 in either a reception mode or a transmission mode. When the reception mode is set, the communication processing section 13 receives a signal of frequency indicated by the control section 12, and demodulates a received signal and emits a sound from the speaker section 14. When the transmission mode is set, the communication processing section 13 modulates a carrier by a sound signal input from the microphone 15 and transmits the signal of frequency which indicated by the control section 12 from the antenna 5.

When the operator depresses the emergency start key 2, an alarm operation mode is set. When the alarm operation mode is set, the control section 12 indicates the communication processing section 13 to change an operating frequency to a predetermined frequency automatically. In case of an amateur radio communication apparatus, a third party is preferable to hear a CALL frequency (145 MHz or 433 MHz). Therefore, it is advisable to set to those frequencies for the alarm operation mode or a predetermined emergency communication frequency.

The control section 12 also outputs an alarm burst sound such as the beep sound (any signal is possible, but it is preferable to be one which is easily detectable by a third party), etc. from the speaker 14. In such a case, the speaker 14 is set on the maximum volume to easily hear by a third party.

Next, the control section 12 outputs the alarm burst sound and sets an working condition to a transmitting condition, and transmits a carrier signal which is demodulated by the burst sound. Therefore, the same signal, output by the speaker 14, is transmitted by radio to predetermined frequency. The alarm operation mode has been continued until the power source is turned off or a user him/herself turns off the mode.

Thus, this radio communication apparatus 1 transmits information indicating occurrence of emergency to middle-distance or long-distance range by radio waves and emits the alarm burst sound on the maximum volume from the speaker 14, and then informs any third party a short-distance away of occurrence of emergency. Therefore, an owner of this radio communication apparatus 1 has a good possibility of being found.

Figure 3:
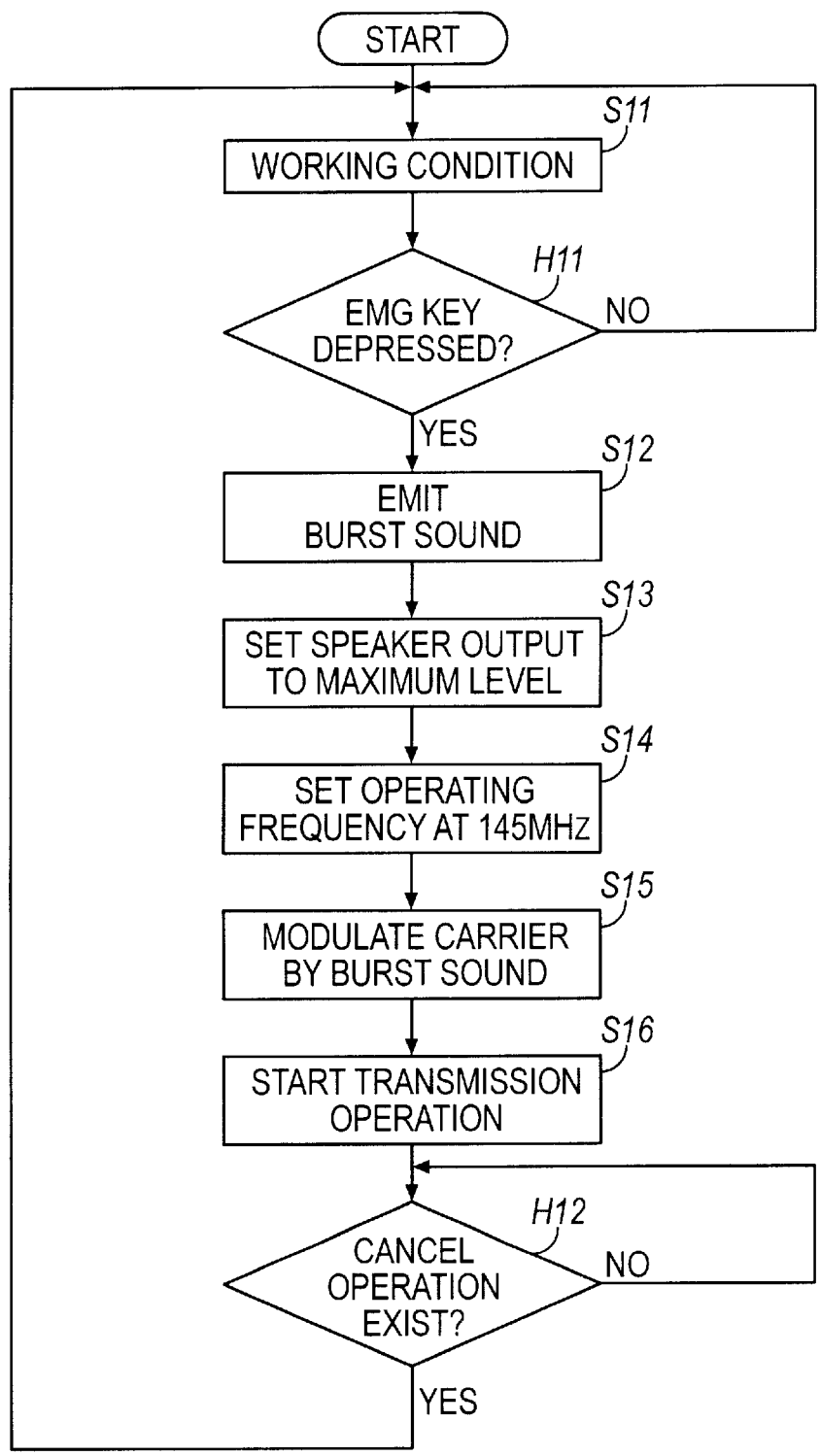
FIG. 3 is a flowchart showing the operation of the radio communication apparatus according to the first embodiment of the present invention.

Next, the operation of the radio communication apparatus 1 shown in FIGS. 1 and 2 now will be described according to a flowchart in FIG. 3.

When the control section 12 is powered on, a working condition or a standby condition is set (step SI 1).

In this operation, the control section 12 has always determined whether or not the emergency mode start key (EMG key) 2 is depressed (step H11). When it is determined that the EMG key 2 is not depressed, the flow returns to step S11 and to continue the normal communicating condition.

When it is determined that the emergency mode start key 2 is depressed, the communication processing section 13 is indicated to output the alarm burst sound, that is, to start up a burst sound producing section (step S12). And then the speaker 14 is set on the maximum volume (step S13).

Next, the control section 12 indicates the communication processing section 13 to set an operating frequency of the radio communication apparatus 1 to the predetermined frequency (145 MHz in the flowchart) (step S14). And the carrier is modulated by the burst sound (step S15) and transmitted (step S16). Next, it is determined whether or not an emergency alarming condition has been canceled (step H12). When it is determined that the emergency alarming condition is not canceled, to continue the present condition. When it is determined that the emergency alarming condition is canceled, the flow returns to step S11 and continue the normal radio communicating condition.

The radio communication apparatus 1 of this embodiment transmits information indicating occurrence of emergency to a middle-distance or long-distance by radio and emits the alarm burst sound on the maximum volume from the speaker 14. Therefore, occurrence of emergency is informed by the radio signal for middle and long-distance people and by the beep sound for short-distance people. Consequently an owner of the radio communication apparatus 1 has a good possibility of being found.

And, only operating the emergency mode start key 2 can set the emergency mode, it is effective when an owner can not move freely.

Second Embodiment

The second embodiment of the present invention now will be described.

The structure of the radio communication apparatus of this embodiment has the same structure as shown in FIGS. 1 and 2, but the operation of the control section 12 is different from the first embodiment. Next, this point will be mainly described.

Figure 4:
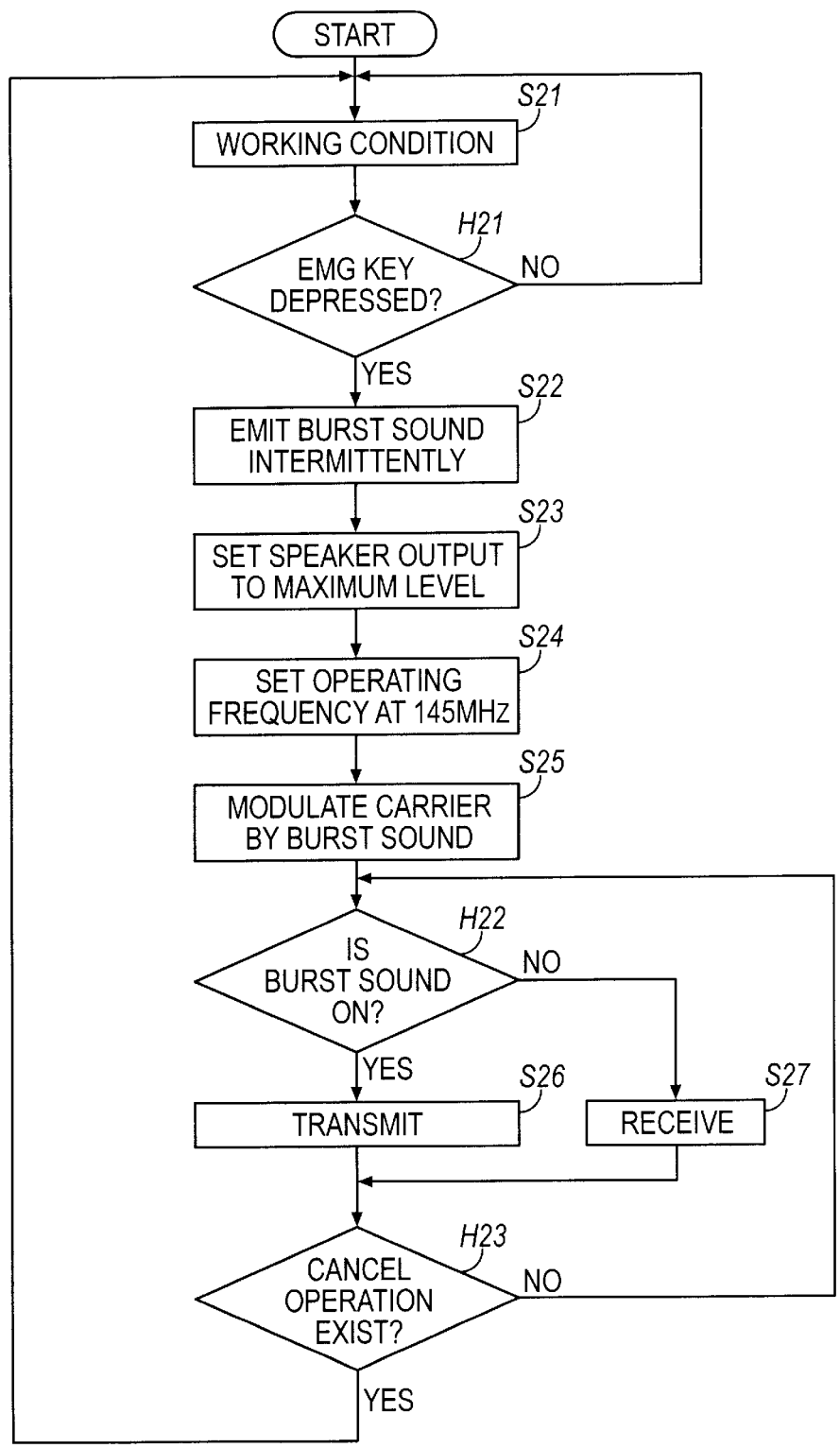
FIG. 4 is a flowchart showing the operation of the radio communication apparatus according to the second embodiment of the present invention.

FIG. 4 is a flowchart showing the operation of the control section 12.

When the control section 12 is powered on, the wording condition or standby condition is set (step S21).

In this operation, the control section 12 has always determined (for example, corresponding to a timer interruption) whether or not the emergency mode start key (EMG key) 2 is depressed (step H21). When it is determined that the emergency mode start key (EMG key) 2 is not depressed, the flow returns to step S21 and continue the normal communicating condition.

When it is determined that the emergency mode start key 2 is depressed in step H21, the control section 12 makes the communication processing section 13 emit the alarm burst sound (step S22), and then sets the volume of the speaker 14 on the maximum volume and emits the burst sound (step S23).

Next, the operating frequency of the communication processing section 13 is set to the predetermined frequency (145 MHz in the flowchart) (step S24). And the carrier is modulated by the burst sound (step S25).

Then, it is determined whether the burst sound is on or off. When it is determined that the burst sound is on, the control section 12 transmits the carrier modulated by the burst sound from the antenna 5 (step S26). When it is determined that the burst sound is off, the control section 12 is in a receiving condition (step S27).

After step S27 and S26, it is determined whether or not the emergency alarming condition is canceled (step H23). When it is determined that the emergency alarm condition is not canceled, the flow returns to step H22. When it is determined that the emergency alarm condition is canceled, the flow returns to step S21 and to continue the normal communicating condition.

According to this embodiment, intermittent burst sounds occurring on and off are linked with a transmission and reception respectively. Therefore, when a third party, who was received the alarm from the radio communication apparatus 1, transmits an answer, the answer can be heard in a receiving term. Thus, an owner of the radio communication apparatus 1 can check whether or not the alarm is received by a third party.

Third Embodiment

The third embodiment of the present invention now will be described.

A general view of the radio communication apparatus 1 of this embodiment is, for example, the same as shown in FIG. 1.

Figure 5:
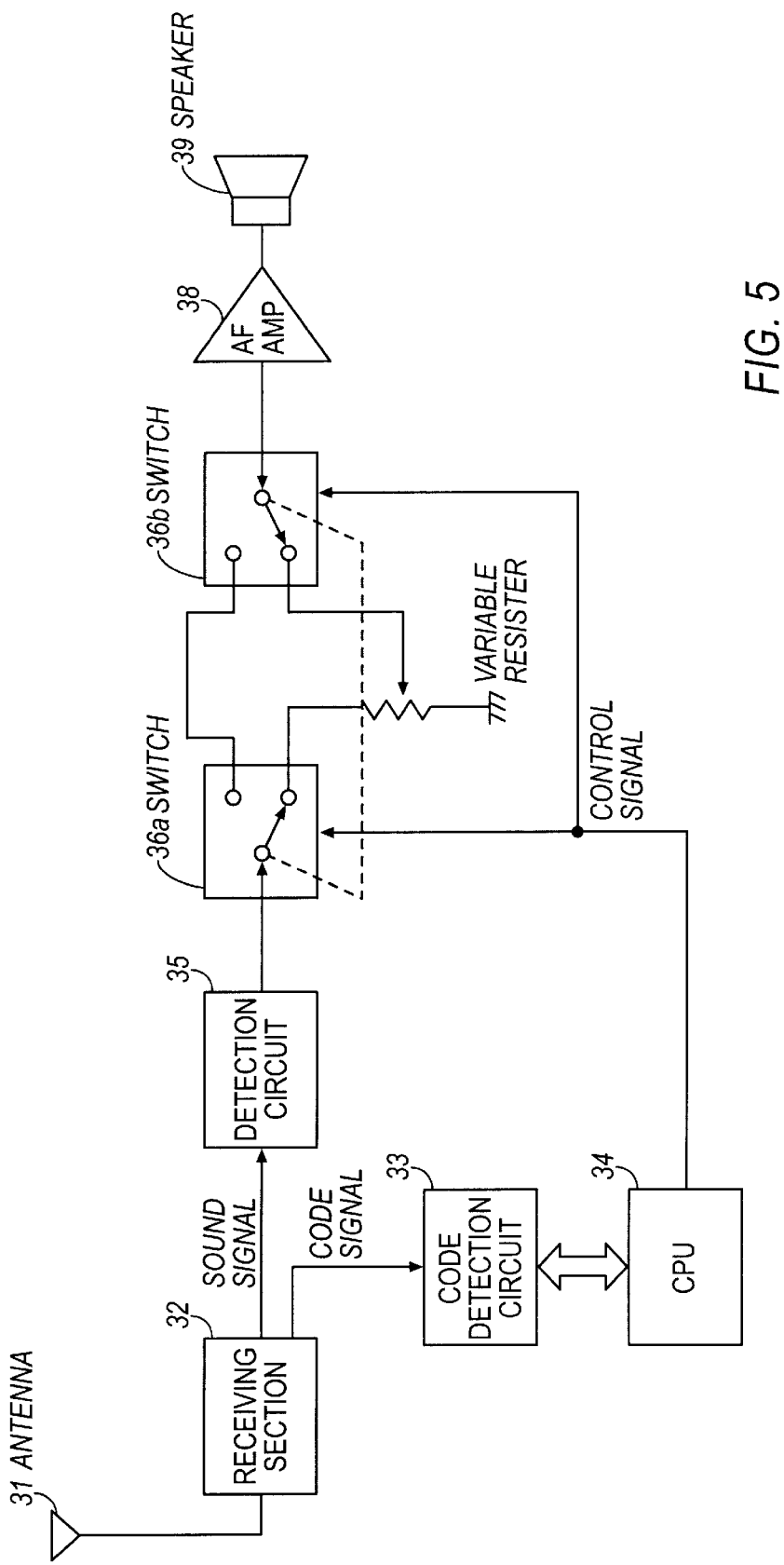
FIG. 5 is a circuit diagram showing the circuit structure of the radio communication apparatus according to the third embodiment of the present invention.

FIG. 5 is a block diagram showing a reception circuit of the radio communication apparatus 1 of the third embodiment.

As shown in the figure, this radio communication apparatus 1 comprises an antenna 31, a receiving section 32, a code detection circuit 33 for detecting an ID code and control code, a CPU 34, a detection circuit (DET) 35, switches 36a and 36b, a variable resister 37, a low-frequency amplifier 38 and a speaker 39.

The receiving section 32 demodulates a received signal input from the antenna 31, and amplifies it. The detection circuit 35 detects a sound signal of that output. And then the demodulated code signal is supplied to the code detection circuit 33.

The detection circuit 35 detects the supplied sound signal and supplies to the switch 36a.

The switch 36a supplies the sound signal, supplied from the detection circuit 35, to the variable resister 37 in normal mode. When a predetermined change signal is supplied from the CPU 34, the sound signal is supplied to the switch 36b.

The variable resister 37 works as a volume switch to adjust the volume of the speaker 39. The variable resister 37 attenuates the supplied sound signal and supplies it to the switch 36b.

The switch 36b selects the attenuated sound signal supplied from the variable resister 37 in normal mode. When the predetermined change signal is supplied from the CPU 34, the sound signal which is directly supplied from the switch 36a, is selected and supplied to the low-frequency amplifier 38.

The low-frequency amplifier 38 amplifies the supplied sound signal and emits the sound from the speaker 39.

The code detection circuit 33 detects a self ID code and emergency control code from the code signal received and demodulated in the receiving section 32. When the code detection circuit 33 detects those codes, a signal, indicating the detected code, is supplied to the CPU 34.

The CPU 34 controls the whole operation of the radio communication apparatus 1. Especially in this embodiment, when the code detection circuit 33 detects a predetermined code, the CPU 34 supplies a predetermined change control signal to the switches 36a and 36b. The CPU 34 also comprises a timer such as a software timer.

Next, the operation of a receiver of this embodiment now will be described according to FIGS. 6A and 6B.

Figure 6A:
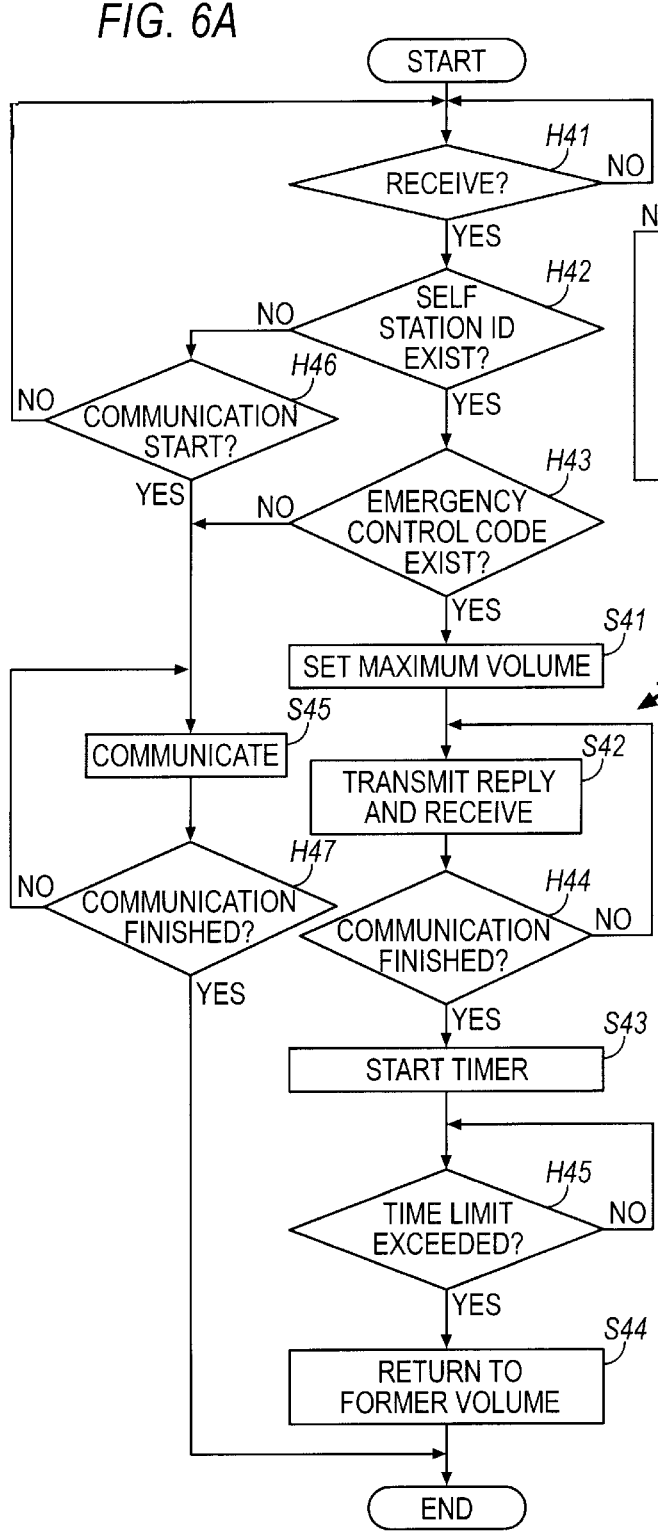
FIGS. 6A and 6B are flowcharts showing the operation of the radio communication apparatus according to the third embodiment of the present invention.

FIG. 6A is a flowchart showing a receiving operation of the radio communication apparatus 1. FIG. 6B is a flowchart showing for transmitting an emergency control code in between base stations or the radio communication apparatuses 1.

The emergency control code is used based on one code system of CTCSS, MSK, DCS, DTMF, 2TONE and 5TONE for selective calling. For example, as described by DTMF, when a calling remote station ID code is "456", a transmitting station ID code is "123" and the emergency control code is "987", the emergency control code is transmitted as "456*123*987".

A transmission operation of a control code shown in FIG. 6B now will be described.

Figure 6B:
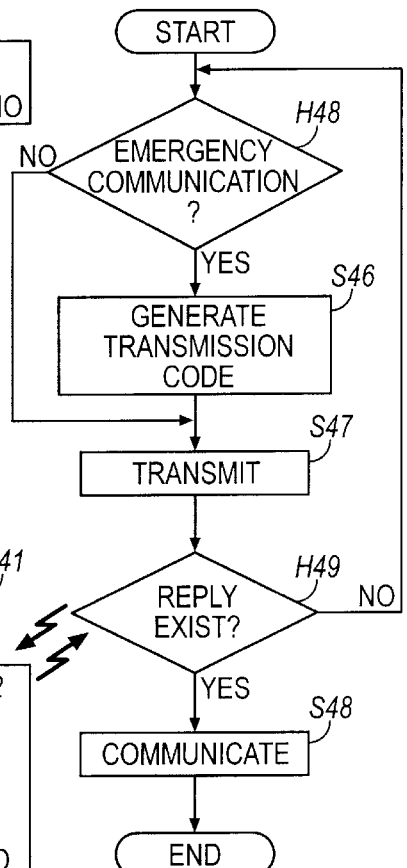

A process of FIG. 6B, for example, is started up when a transmission is indicated.

First, it is determined whether or not an emergency communication is designated (step H48). When it is determined that the emergency communication is designated, a call signal, composed of a communicating remote station ID code and an emergency control code, is generated (step S46) and both a generated code and a normal sound signal are transmitted at the same time (step S47). In step H48, when it is determined that the emergency communication is not designated, the normal sound signal, etc. is transmitted (step S47).

Next, it is determined whether or not a reply from a remote station exists (step H49). When it is determined that the reply from the remote station exists, communicating with the remote station (step S48). When it is determined in step H49 that the reply does not exist, the flow returns to step H48 and repeat that process.

In case of a reception side radio communication apparatus 1, as shown in FIG. 6A, it is determined whether or not a radio signal is received (step H41). When it is determined that the radio signal is received, it is determined whether or not the received signal contains a self station ID code (step H42). When it is determined that the received signal does not contain the self station ID code, it is determined whether or not the operator intends to communicate with the remote station (step H46). When it is determined that the operator does not intend to communicate with the remote station, the flow returns to step H41 and the above-described process is repeated.

When it is determined in step H46 that the operator intends to communicate with the remote station, communication with the remote station (step S45, remote station step S48) is performed, and it is determined whether or not the communication is finished (step H47), when it is determined that the communication is finished, the communication process is finished.

In step H42, when it is determined that a received signal contains the self station ID code, it is determined whether or not the received signal contains the emergency control code (step H43).

When it is determined that the received signal does not contain the emergency control code, the flow returns to step S45 and perform a normal communication. When it is determined that the received signal contains the emergency control code, a change control signal is sent out to the switches 36a and 36b to set sound volume of the speaker 39 on the maximum volume. And then, the switch 36a directly supplies a sound signal supplied from the detection circuit 35 to the switch 36b, and the switch 36b selects the signal supplied from the switch 36a. Therefore, the sound signal is supplied to the low-frequency amplifier 38 without attenuating the sound signal in the variable resister 37 (step S41).

Next, during this condition, the radio communication apparatus 1 transmits a reply and performs communication (step S42). And, it is determined whether or not the communication is finished. When it is determined that the communication has not finished, to carry on transmitting the reply and communication (step H44).

Moreover, when it is determined in step H44 that the communication is finished, the CPU 34 starts self timer (step S43), and sets it for a fixed period of time (step H45). When the fixed period of time has passed, the change control signal is turned off to return sound volume where it was (step S44).

According to the above-described structures, when the emergency control code is transmitted, sound volume of the radio communication apparatus 1 can be set on the maximum volume automatically. On account of this, an owner of the radio communication apparatus 1 can prevent from the situations where the owner of the radio communication apparatus fails to hear an emergency call because sound volume of the reception side radio communication apparatus 1 is low, etc.

In the above-described embodiment, only when both the self station ID code and the emergency code are detected in the received signal, the received volume is set on the maximum volume. It is also possible only when the emergency control code is detected, the sound volume is to be set on the maximum volume.

Fourth Embodiment

According to the above-described first to third embodiments, the radio communication apparatus 1, which is receiving an emergency communication frequency, can only receive an emergency communication. Therefore, the number of the radio communication apparatuses 1 which can receive the emergency communication are limited.

The radio communication apparatus 1 which can solve such a matter now will be described.

Figure 7:
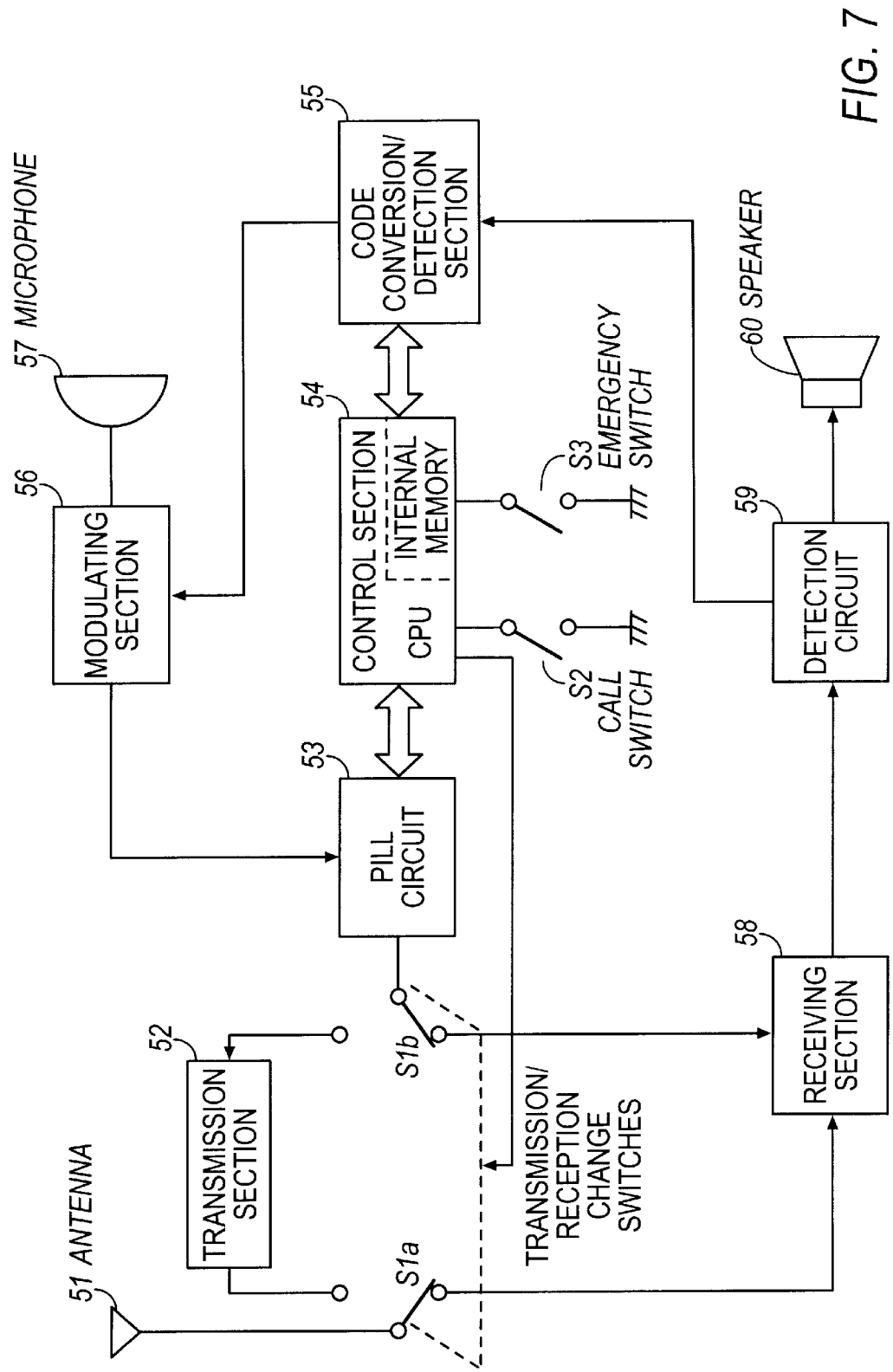
FIG. 7 is a circuit diagram showing the circuit structure of the radio communication apparatus according to the fourth embodiment of the present invention.

FIG. 7 is a block diagram showing a structure of the radio communication apparatus 1 according to the forth embodiment of the present invention.

The radio communication apparatus 1 comprises an antenna 51, a transmitting section 52, a PLL circuit 53, a control section 54, a code conversion/detection section 55, a modulating section 56, a microphone 57, a receiving section 58, a detection circuit (DET) 59, a speaker 60, transmission/reception change switches S1a and S1b, a call switch S2 and an emergency switch S3.

The transmitting section 52 amplifies an input signal, and transmits by radio through the antenna 51.

The PLL circuit 53, contains a voltage controlled oscillator (VCO), supplies a local signal for demodulating to the receiving section 58. The PLL circuit 53 also converts an oscillation frequency in response to a signal supplied from the modulating section 56 and generates a transmission signal.

The control section 54, contains a CPU and an internal memory, controls the whole operation of this system. The internal memory previously stores a equipment discrimination code of the radio communication apparatus 1, an emergency control code indicating emergency and an emergency communication frequency.

The code conversion/detection section 55 receives such as the ID code and the control code contained in the transmission signal from the control section 54, and converts these codes into code data for transmission based on a predetermined code system. The code conversion/detection section 55 also detects the ID code and the control code contained in the received signal.

The modulating section 56 modulates the transmission signal input from the microphone 57.

The receiving section 58 contains a mixer, an intermediate frequency circuit (IF circuit), etc. for converting a frequency of a radio signal supplied through the antenna 51. The receiving section 58 also converts the received signal into an intermediate frequency signal by using the local signal supplied from the PLL circuit 53.

The detection circuit 59 detects (demodulates) the signal supplied from the receiving section 58 and emits a sound through the speaker 60.

The call switch S2 is depressed when transmission starts.

The transmission/reception change switches S1a and S1b, linked with the call switch S2, change a transmission mode (transmitting condition) and a reception mode (receiving condition) respectively. When it is determined that the call switch S2 is off, the receiving section 58 is connected to the antenna 51 and the PLL circuit 53. When it is determined that the call switch S2 is on, the transmitting section 52 is connected to the antenna 51 and the PLL circuit 53.

The emergency switch S3 is depressed when an emergency occurs.

Next, a transmission operation now will be described.

In a normal transmitting mode, the operator inputs a communicating remote station ID code and self station ID code. The control section 54 outputs an input remote station ID code and self ID code to the code conversion/detection section 55. The code conversion/detection section 55 converts the supplied ID code into a transmission code based on one of the predetermined code systems (CTCSS, MSK, DCS, DTMF, 2TONE and 5TONE). It may be possible that the communicating remote station ID code and self station ID code are previously stored in the internal memory of the control section 54, and the ID code, stored in the internal memory, are supplied to the code conversion/detection section 55.

When the call switch S2 is depressed, the control section 54 outputs the generated transmission code to the code conversion/detection section 55. The modulating section 56 modulates a transmission frequency signal by the supplied ID code. The PLL circuit 53 converts the oscillation frequency based on the modulated signal, and then generates an FM signal. The transmission section 52 electrically amplifies the FM signal and transmits through the antenna 51.

When the reply signal, transmitted from the remote station is received, communication starts.

When emergency such as an earthquake, fire, etc. occurs in a communicating condition or a reception standby condition, the operator immediately depresses the emergency switch S3.

When the emergency switch S3 is depressed, the control section 54 is set in emergency mode. A CPU of the control section 54 reads out the emergency control code from the internal memory and outputs it to the code conversion/detection section 55 (It need not depress the call switch S2). The code conversion/detection section 55 converts the emergency control code into the transmission code and supplies it to the modulating section 56.

The modulating section 56 amplitude-modulates the carrier signal by the emergency control code. The PLL circuit 53 converts the oscillation frequency based on the amplitude-modulated signal, and then generates the FM signal. The transmitting section 52 electrically amplifies the FM signal and transmits through the antenna 51.

When the transmission of the emergency control code is finished, the CPU of the control section 54 reads out emergency communication frequency data previously stored in the internal memory, outputs it to the PLL circuit, and converts the oscillation frequency into the emergency communication frequency.

And then, based on the frequency for the emergency communication, the emergency communication is started in response to the on/off operation of the call switch S2.

In emergency mode, for example, the control section 54 observes the suspension period of the emergency communication by the internal timer (software timer) and when the suspension period passes the predetermined period, the control section 54 cancels the emergency mode and returns to the normal communication frequency.

Next, a receiving operation now will be described. When the call switch S2 is off, the transmission/reception change switches S1a and S1b are changed to the receiving section 58 side. The antenna 51 and the receiving section 58 are connected, and the output signal of the PLL circuit 53 is supplied to the receiving section 58.

The receiving section 58 receives a radio signal of a specific frequency (call frequency) by using a local signal supplied from the PLL circuit 53, and supplies it to the detection circuit 59.

The detection circuit 59 detects the supplied signal and outputs a sound (audio signal) from the speaker 60.

A part of the outputs of the detection circuit 59 is supplied to the code conversion/detection section 55 for detecting the ID code.

The code conversion/detection section 55 detects whether or not the ID code is existed. And the code conversion/detection section 55 also detects the self station ID code, the remote station ID code and the emergency control code.

The code conversion/detection section 55 has always detected the ID code. When it is determined that the code conversion/detection section 55 detects the emergency control code in the communicating condition, the control section 54 is noticed to have a contact. The control section 54 is set in emergency mode based on the notice. The CPU of the control section 54 reads out the emergency communication frequency from the memory, outputs it to the PLL circuit 53, and the operating frequency is changed from the call frequency to the emergency communication frequency of both the transmission and reception mode. Then, in case of an emergency, the emergency communication with the remote station is performed by the on/off of the call switch S2. The emergency control code and emergency communication frequency are previously stored in the internal memory of the control section 54.

The control section 54 stores the ID code of the remote radio communication apparatus in the internal memory, and observes the suspension period of the emergency transmission by such as the internal timer. When the suspension period passes the predetermined period and the reply transmitted from the remote radio communication apparatus in the emergency communication is stopped, the control section 54 cancels the emergency mode and returns the operation frequency to the normal communication frequency. The normal communication frequency is previously stored in the internal memory.

Figure 8A:
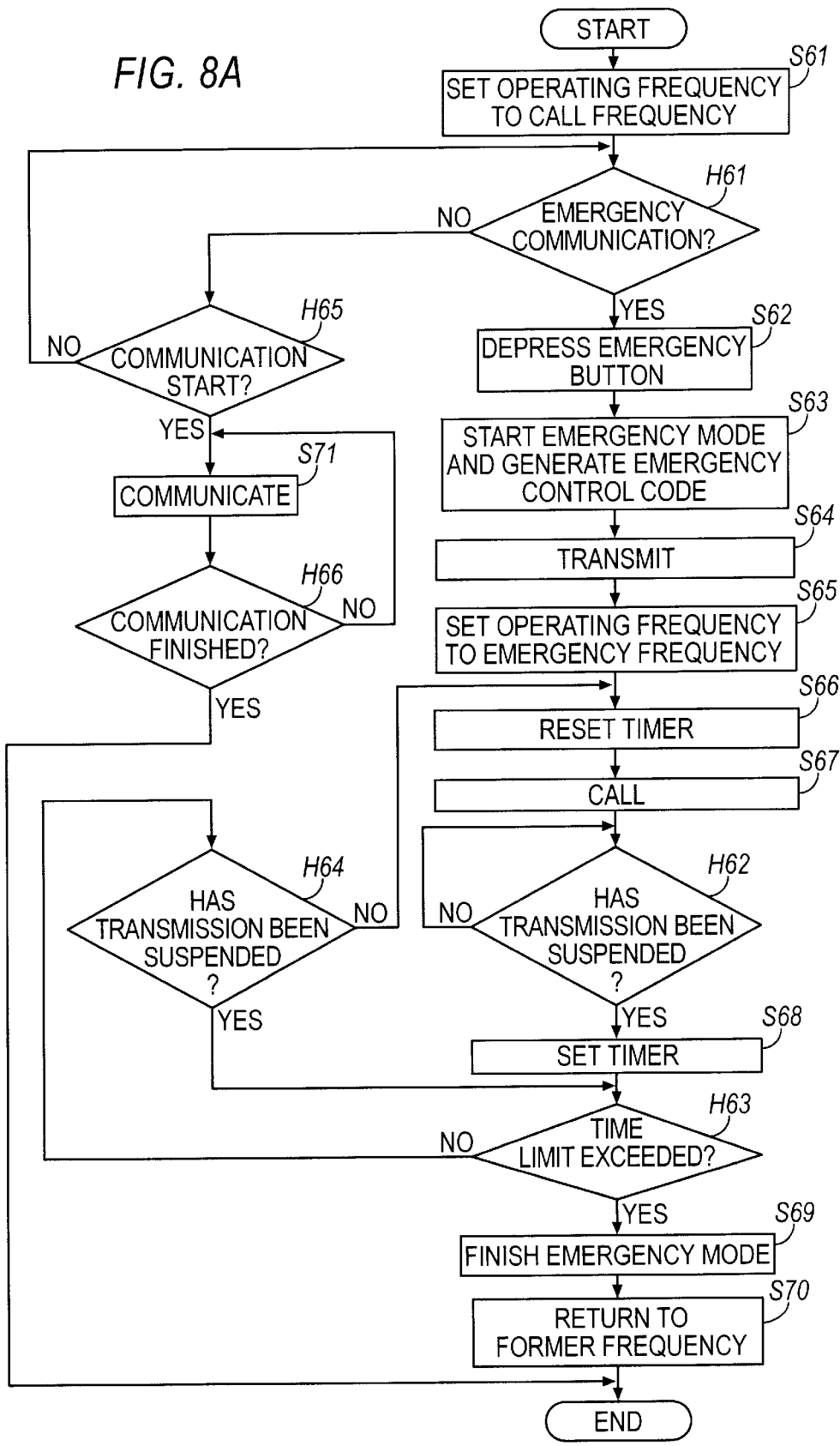
FIGS. 8A and 8B are flowcharts showing the operation of the radio communication apparatus according to the fourth embodiment of the present invention.
Figure 8B:
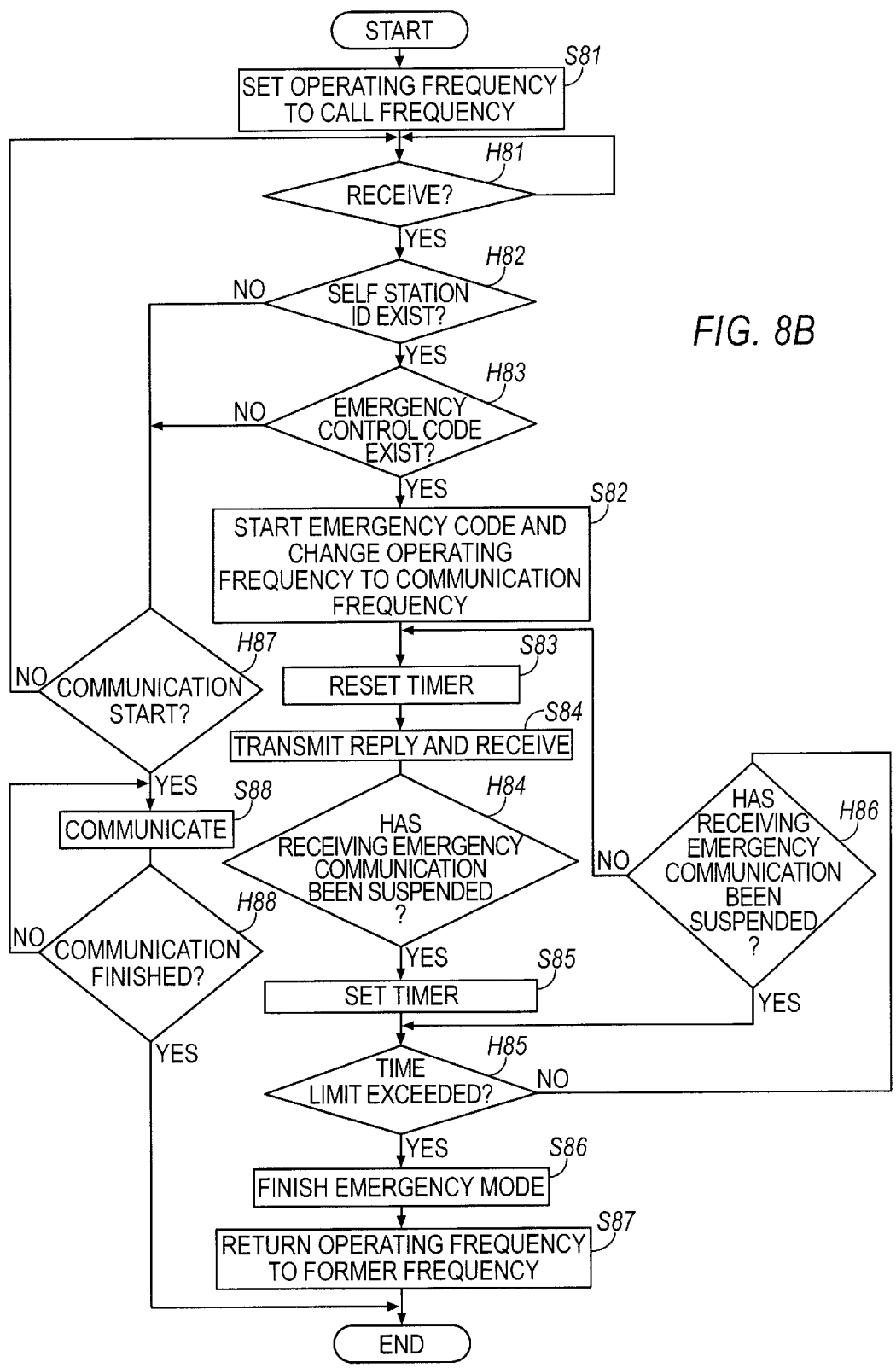

FIGS. 8A and 8B are flowcharts showing operations of emergency transmission/reception.

FIG. 8A is a flowchart for transmitting the emergency control code from the radio communication apparatus 1 which is facing emergency. FIG. 8B is a flowchart for the reception process of the radio communication apparatus 1.

An emergency transmission operation of the radio communication apparatus 1 now will be described.

First, a normal communication condition is described.

The operator sets a call frequency for communicating the remote station or group (step S61). And the operator determines whether or not the emergency communication is needed (step H61). When it is determined that the emergency communication is not needed, it is determined whether or not the communication is needed (step H65). When it is determined that the communication is not needed, the flow returns to step H61.

When it is determined that the communication is needed, the communication is performed (step S71). It is determined whether or not the communication is finished (step H66), and the communication is continued until the communication is finished.

When it is determined in step H61 that the emergency communication is needed, the operator depresses the emergency switch S3 (step S62).

The control section 54 reads out the emergency control code stored in the internal memory, generates the transmission code, which contains the ID code of the remote station or specific group and the emergency control code (step S63), and transmits the code (step S64). That is, the emergency control code is transmitted one time on the normal communication frequency.

An emergency control code is used based on one code system of CTCSS, MSK, DCS, DTMF, 2TONE and 5TONE. For example, described by DTMF, when a calling remote station ID code is "456", the self station ID code is "123" and the emergency control code is "987", the emergency control code for transmission is such as "456*123*987".

When the emergency code is transmitted, the CPU of the control section 54 reads out the frequency data of the emergency communication frequency stored in the internal memory, and supplies it to the PLL circuit 53. And the PLL circuit sets the transmission frequency and reception frequency on the emergency communication frequency, and then the emergency mode is set (step S65).

Then, the timer is reset in step S66, information of the emergency is transmitted to the remote station or group in step S67, and the emergency communication mode is started.

Next, for observing the suspension period of transmission in the emergency communication frequency, it is determined whether or not the transmission code is existed. And that determination has been continued until the transmission is finished (step H62). When it is determined that the transmission is finished, the timer is set (step S68) and it is determined whether a count value of the timer is exceeded a standard value (step H63).

When it is determined that the count value of the timer is not exceeded the standard value, that is, the time limit is not exceeded, measuring the suspension period in the suspension period of the transmission (step H64). When it is determined that the transmission is existed in a fixed period of time, the flow returns to step S66 and set the timer.

When the fixed period of time is set, it will be set by a minutes-unit such as three minutes or five minutes because it is set for emergency.

When it is determined that the transmission is not existed in the fixed period of time, it is determined in step H63 that the time limit is exceeded and the emergency mode is canceled in step S69. Then, the control section 54 indicates the PLL circuit 53 to return from the operating frequency to the normal frequency (step S70) and, as a result, the communication condition is in normal mode.

The operation of the received side radio communication apparatus according to FIG. 8B now will be described.

First, the call frequency, which is for communicating with the remote or group, is set (step S81). It is determined whether or not a radio signal is received (step H81), and to wait until the radio signal is received.

When it is determined that the radio signal is received, it is determined whether or not the received signal contains the self station ID code or group ID code, to which self station belongs, (step H82). When it is determined that the received signal contains self station ID code, it is determined whether or not the received signal contains the emergency control code (step H83).

In any condition, when a communicating remote station is in an emergency, it is determined in step H82 and H83 that self ID code and the emergency control code are existed for receiving the emergency control code generated in step S63. And when the code conversion/detection section 55 detects both codes, the control section 54 is noticed the emergency mode. Based on this notice, the control section 54 sets to the emergency mode and indicates the emergency communication frequency to the PLL circuit 53. The PLL circuit 53 oscillates on the emergency communication frequency, and changes the operating frequency into the emergency communication frequency such as the CALL frequency (step S82).

Next, the timer, which is for measuring the suspension period of emergency communication, is previously reset (step S83).

And, transmit the reply, and communicate on the emergency frequency (step S84). For example, contents of emergency, an inquiry of present condition, etc. are confirmed by communication.

Then, to observe the suspension period of reception of the radio signal of the emergency communication frequency, it has been determined whether or not the received signal is existed until communication is finished (step H84). When it is determined that communication is finished, set the timer (step S85) and it is determined whether or not the count value of the timer is exceeded the standard value (step H88).

When it is determined that the count value of the timer has not exceeded the standard value, that is, the time limit is not exceeded, see the suspension period of reception (step H86). When it is determined that a reception exists in the fixed period of time, the flow returns to step S83 and reset the timer.

When this fixed period of time is set, it will be set by in a short period such as three minutes or five minutes because it is set for an emergency.

When it is determined that the transmission does not exist by the transmission side, or the reception side does not receive the signal, it is determined in step H85 that the time limit is exceeded and the emergency mode is canceled in step S86. Then, the control section 54 indicates the PLL circuit 53 to return from the operating frequency to the normal frequency (step S87) and, as a result, the communication condition returns to the normal mode.

In step H82 or H83, when it is determined that the received signal does not contain the self station ID code or emergency control code, the flow proceeds to step H87. It is determined whether or not the communication with the remote station exists, when it is determined that the communication with the remote station exists, to continue communication (step S88). When the operator decides not to communicate with the remote station, the flow returns to step H81 and repeats the above-described operations.

Next, it is determined in step H88 whether or not the communication is finished, when it is determined that the communication is not finished, the flow returns to step S88 and continue the communication. When it is determined in step H88 that the communication is finished, the process is ended.

As above-described, according to the embodiment, when any emergency situation occurs, only depressing the emergency switch S3 can automatically set the transmission frequency to the predetermined emergency communication frequency, hereafter, the communication is executed on this frequency.

Moreover, when any emergency situation occurs in case of communicating, the control code is transmitted one time on the former call frequency and the operating frequency of the reception side radio communication apparatus is automatically converted into the emergency communication frequency. As the result of this, it can keep contact with the communicating radio communication apparatus.

The present invention is not limited the above-described embodiment and modifications of changes may be made without departing from the spirit of the present invention.

For example, circuit structures as shown in FIGS. 2, 5 and 7 are only examples and can be changed or modified.

And, operation flows as shown in FIGS. 3, 4, 6A, 6B, 8A and 8B are also

What is claimed is:

1. A radio communication apparatus, comprising;

a switch which is operable by a user;

a transmitter for transmitting a predetermined code one time with a first frequency in response to the operation of said switch when said switch is operated while in communication with another radio communication apparatus with said first frequency, and for then transmitting said predetermined code with a second frequency which is different from said first frequency; and a receiver for changing a reception frequency to said second frequency when a predetermined code is received while in communication with said another radio communication apparatus using said first frequency.

2. A radio communication apparatus, comprising:

an emergency switch, which is operable by a user, for indicating occurrence of emergency;

memory for storing a control code indicating occurrence of emergency;

transmission means for reading out said control code from said memory by the operation of said emergency switch, and transmitting said control code with a previous transmission frequency;

means for changing the transmission frequency of said transmission means to an emergency communication frequency after transmission of said control code; and reception means for receiving a radio signal and changing a call frequency to the emergency communication frequency upon detection of the control code in the received signal.

3. The radio communication apparatus according to claim 2, further comprising means for measuring a suspension period of time of communication with the emergency communication frequency and returning the emergency communication frequency to a previous transmission frequency when the suspension period of time exceeds a predetermined period.

4. The radio communication apparatus according to claim 2, wherein:

said transmission means transmits a signal containing a discrimination code assigned thereto in response to the operation of said emergency switch with the emergency communication frequency; and said reception means discriminates whether or not a suspension period of the received signal exceeds a fixed period of time, and when said reception means discriminates if the suspension period of the received signal exceeds the fixed period of time, said reception means returns the emergency communication frequency to the previous call frequency.

5. The radio communication apparatus according to claim 2, wherein said control code is a control code based on one of CTCSS, MSK, DCS, DTMF, 2TONE and 5TONE.

6. A method for changing a communication frequency in case of emergency while at least two radio communication apparatuses, including first and second radio communication apparatuses, are communicating with each other using a first communication frequency and when a predetermined switch with which said first radio communication apparatus is equipped is operated, said method comprising steps of:

transmitting a predetermined code one time with said first frequency from said first radio communication apparatus, and then transmitting a predetermined code with a second frequency for emergency communication from said first radio communication apparatus receives a predetermined code transmitted from said first radio communication apparatus; and making said second radio communication apparatus change the reception frequency to said second frequency when said second radio communication apparatus receives the predetermined code transmitted with said first frequency from said first radio communication apparatus.

\* \* \* \* \*